3,466,933
BALANCING SYSTEM

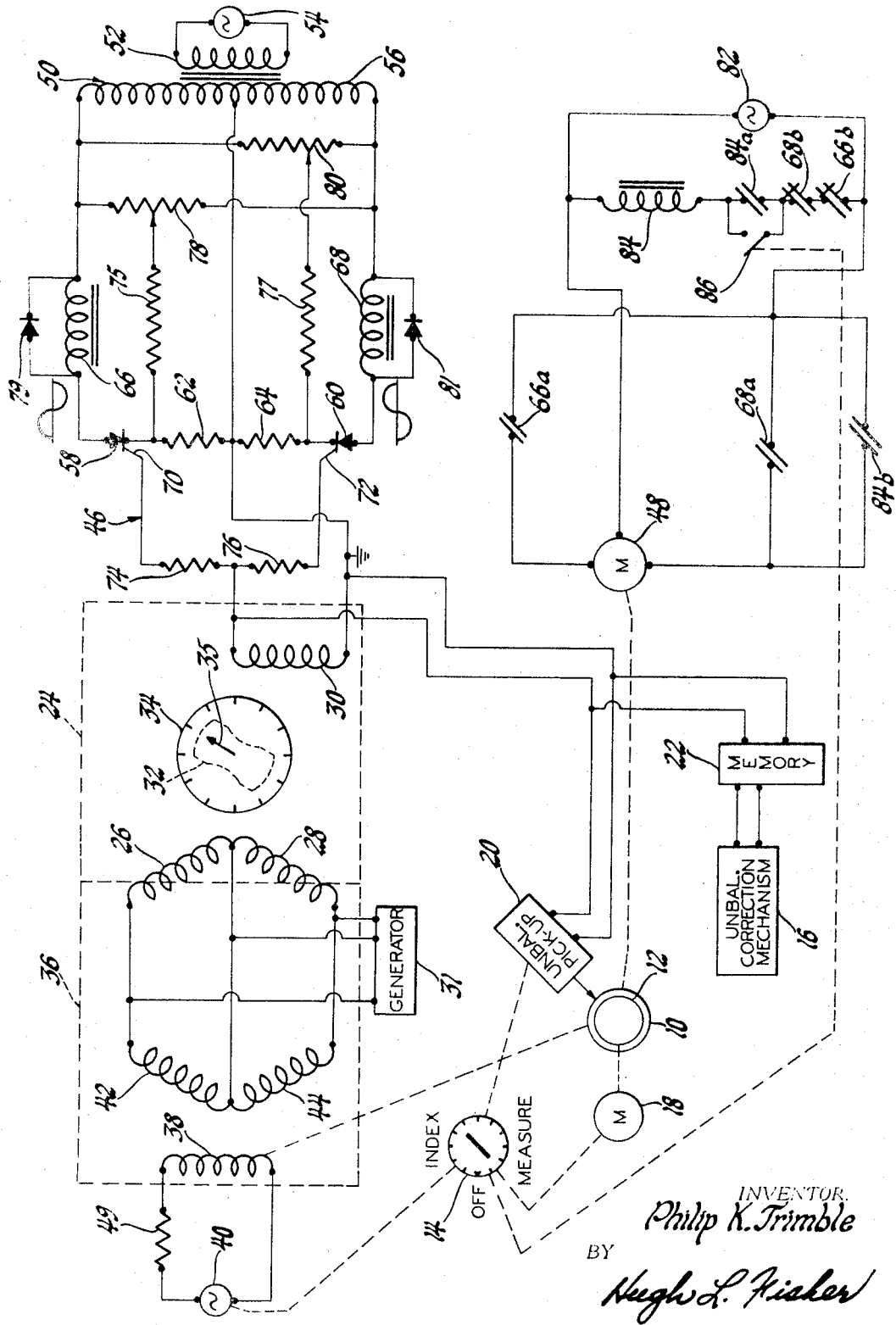

Philip K. Trimble, Rochester, Mich., assignor to General Motors Corporation, Detroit, Mich., a corporation of Delaware
Filed Oct. 20, 1966, Ser. No. 588,097
Int. Cl. G01m 1/16
U.S. Cl. 73—462
13 Claims

ABSTRACT OF THE DISCLOSURE

A balancing system in which controlled rectifiers are used to control the angular amount and the direction in which an indexing motor is rotated to null an error signal reflecting the relative positions of the unbalance in a workpiece and an unbalance correction mechanism.

---

This invention relates to improvements in systems for balancing rotating parts.

For a balancing system to be automatic, the three basic steps involved must occur in a properly timed sequence. During the first step, the unbalance in the part or, as it is usually referred to, the workpiece is measured both as to location and amount. During the second step, or what is often designated as the indexing step, the workpiece is properly aligned with an unbalance correction mechanism in accordance with the location information derived during the measuring step. The final step is the correction step, and the unbalance correction mechanism then adds or removes material in accordance with the information about the amount of unbalance.

When this automatic balancing is to be done electrically and/or electronically, it will be appreciated that the circuitry can become very complex, particularly when the unbalance can occur anywhere in a circular workpiece and, therefore, indexing must be over a 360° range. Then too, since the unbalance signal is a sine wave, phase relationships must be considered and whether the unbalanced portion or the side opposite the unbalanced portion is aligned with the unbalance correction mechanism. Also a problem is proper braking or stopping of the relative indexing movement once initiated so that correct alignment between the unbalanced portion of the workpiece and the unbalance correction mechanism occurs.

Accordingly, novel apparatus is contemplated involving, in effect, a closed loop system for developing a magnetic field reflecting the relative positions of a workpiece and an unbalance correction mechanism, altering this magnetic field in accordance with the location of the unbalanced portion of the workpiece, and then utilizing this altered magnetic field to develop a switching error signal quantity for causing correction alignment between the workpiece and the unbalance correction mechanism.

Further contemplated is a unique switching control for the apparatus by which the direction and extent of relative movement between the workpiece and the unbalance correction mechanism is controlled in accordance with the polarity and the amplitude of the switching error signal.

To avoid the problem of the workpiece being 180° out of position or in the so-called wrong null position, a new and different provision is made for always initially causing relative movement between the workpiece and the unbalance correction mechanism when in a null position and until the signal quality is adequate for normal indexing to occur.

Additionally, a novel coast provision is incorporated in the apparatus so that the relative movement terminates at the proper time without any need for synchronized braking.

In a preferred form of the invention a workpiece position sensor is coupled by a control transformer to an indexing motor control for indexing purposes. A movable armature is positioned during the unbalance measurement so as to alter the magnetic coupling therebetween in accordance with the location of the unbalance in the workpiece. This armature is positioned during the unbalance measuring by using the transformer to align the armature relative to a rotating magnetic field and a magnetic field that reflects the location of the unbalance with respect to a reference point on the workpiece. The indexing motor control then is energized with an electrical signal quantity that reflects the position of the unbalanced portion of the workpiece relative to an unbalance correction mechanism.

The indexing motor control employs two controlled rectifiers, one of which responds to the electrical signal quantity when of one polarity, and the other of which responds to the electrical signal quantity when of the opposite polarity. These controlled rectifiers then cause, through a relay network, the indexing motor to rotate in the corresponding direction and, through a closed loop arrangement, the electrical signal quantity to be nulled. To avoid the wrong null, initiation of the indexing causes the indexing motor to commence movement of the workpiece in one of its two directions if the workpiece is in either of its null positions until one controlled rectifier becomes operative to initiate the normal indexing operation. Therefore, if the workpiece is in the position that would represent the wrong null, it is driven out of this position so that the proper null is sought. Additionally, the biasing of the controlled rectifiers is such that a built-in coast is provided for a particular workpiece so as to avoid the need for a brake.

The foregoing and other objects and advantages of the invention will become apparent from the following description and from the accompanying drawing in which the single figure is a schematic illustration of a balancing system incorporating the principles of the invention.

Referring now to the single figure in detail, the numeral 10 denotes a spindle on which a workpiece 12 is mounted for rotation. A cycle controller 14, in a way well known and as will be further explained, initiates the measurement, indexing and correction cycles either automatically in a timed relationship or manually and selectively. First, of course, is the measurement cycle during which the amount of unbalance and its location is determined. This information about the location of this unbalance is then used during the indexing cycle to properly position the workpiece 12 relative to an unbalance correction mechanism 16 so that the material can be either removed from the workpiece 12, as by drilling, or added to the workpiece 12, as by welding. If preferred, the unbalance correction mechanism 16 can be moved relative to the workpiece 12 or both can be movable.

First to be considered will be the apparatus for the unbalance measuring cycle. A drive motor 18 revolves the spindle 10 and, correspondingly, the workpiece 12 at the appropriate speed for determining its unbalance characteristics. Of course, both the static and dynamic unbalance characteristics can be measured during this rotation as is well known. To sense the unbalance, an unbalance pickup 20 is positioned in any of the usual ways relative to the spindle 10 so as to sense its vibrations due to the unbalance in the workpiece 12 and develop a corresponding unbalance signal of a sinusoidal waveform. The unbalance pickup 20 may be of any suitable type, such as a magnetic or a capacitive type. This unbalance signal will have a phase that indicates the angular location of the unbalanced portion of the workpiece 12 relative to an electrical reference to imaginary reference point on the workpiece 12 and an amplitude indicating the amount.

Hence, the unbalance signal is supplied to an appropriate memory 22 where this amplitude information is retained until utilized by the unbalance correction mechanism 16. Also, the unbalance signal is supplied to a control transformer, as denoted generally at 24.

The control transformer 24 includes quadrature related windings 26 and 28 and a polarizing winding 30. The quadrature related windings 26 and 28 are energized by a two-phase generator 31, while the polarizing winding 30 is energized by the unbalance signal. Positioned within the magnetic field resulting from the energization of these windings 26 and 28 is a rotatable armature 32 formed from some appropriate magnetic material, such as that typically used for transformer cores. This armature 32 will align itself with the resultant of these magnetic fields, and by including a suitable dial 34 and a pointer 35 will directly indicate the angular location of the unbalance in the workpiece 12.

The explanation of the operation of the control transformer 24 during the measurement cycle is discussed in detail in United States Patent No. 3,319,470 to Joseph F. Lash, filed June 19, 1964, and entitled "Balancing System." Briefly, the two-phase generator 31 and the quadrature related windings 26 and 28 combine to provide a rotating magnetic field that revolves at the rate of one revolution per turn of the workpiece 12. With the frequency of energization of the quadrature related windings 26 and 28 being the same as the frequency of energization of the polarizing winding 30, the armature 32 will line up with the position of the field at the instant of maximum vane magnetism and maintain this position, which corresponds to the exact location of the unbalance in the workpiece 12 relative to the mentioned imaginary reference point. This armature 32 retains this position after the excitation of the windings 26 and 28 is removed and, therefore, serves as a memory for the unbalance location information.

After a time interval adequate to complete the unbalance measurement cycle, the cycle controller 14 will initiate the indexing cycle by turning off the two-phase generator 31, the unbalance pickup 20, and the drive motor 18. The apparatus for the indexing cycle includes a resolver or workpiece position sensor 36, which provides workpiece position information. The sensor 36 may be of the conventional synchro construction and includes a rotor winding 38 energized by an AC source 40, which provides preferably 115 volt, 60 cycle per second power, and quadrature related stator windings 42 and 44, which are connected as shown to the control transformer stator windings 26 and 28. The rotor winding 38 is revolvable in a 1:1 relationship with the spindle 10. Consequently, by angularly positioning the rotor of the two-phase generator 31 relative to the spindle 10 in a known way, the output from the position sensor 36 will reflect the exact location of the imaginary reference point on the workpiece 12 relative to the unbalance correction mechanism 16.

This output from the position sensor 36, as mentioned, energizes the control transformer stator windings 26 and 28; and the resultant current flow will develop a magnetic field representing the location of this imaginary reference point relative to the unbalance correction mechanism 16. This action is typical of that occurring in a synchro between its transmitter and receiver. This magnetic field from the stator windings 26 and 28 induces in the polarizing winding 30 an error signal current flow, which is influenced by the magnetic coupling, in turn determined by the angular position of the armature 32. Therefore, the control transformer 24 during the indexing cycle magnetically couples the position sensor 36 to a control circuit 46 for an indexing motor 48 of the stepping type that, for example, steps in 5° increments per each pulse supplied thereto and in a direction determined by the polarity of these pulses. This magnetic coupling is varied in accordance with the position of the movable armature 32. Consequently, the control circuit 46 receives an error signal reflecting the exact angular location of the unbalance relative to the unbalance correction mechanism 16.

Power supplied to the position sensor 36 is preferably maintained low enough so that the control transformer's movable armature 32 remains fixed during the indexing cycle. This is accomplished by including a resistor 49 in series with the source 40 and the rotor winding 38. The value of the resistor 49 is selected to maintain this low power level and thus avoid the need for some type of clamping or braking arrangement for the armature 32.

In operation and as is well known, when the armature 32 has its longitudinal axis perpendicular or 90° displaced from the axis of the resultant field from the quadrature related stator windings 26 and 28, there is a very loose magnetic coupling; hence, there is a minimum energization of the polarizing winding 30 and by calibration a null error signal results. This null error signal also occurs in the 270° position of the armature 32, but will for this explanation be considered the wrong null. When movable armature 32 is in its zero or 180° position and therefore aligned with the axis of the resultant magnetic field produced by these quadrature related stator windings 26 and 28, there is a tight magnetic coupling and a maximum energization of the polarizing winding 30 such that a maximum error signal results. For purposes of the following explanation, it will be assumed that these maximum error signals are negative at 180° and positive at 0°.

The control circuit 46 responds to the amplitude and phase of ths error signal induced in the polarizing winding 30 and causes corresponding operation of the indexing motor 48 so that the workpiece 12 is revolved until the error signal is nulled. In effect and as will become apparent, a closed loop servo system is provided since the error signal causes the indexing motor 48 to rotate the workpiece 12 and correspondingly the position sensor's rotor winding 38 until there is a null error signal. Power for operating the control circuit 46 is supplied by a transformer 50 which has its primary winding 52 energized by an AC source 54. Preferably the source 54 supplies power at 60 cycles per second and 115 volt power and, therefore may be the same as the source 40. The transformer's secondary winding 56 has its center tap connected to the cathodes of a pair of opposed controlled rectifiers 58 and 60, respectively, through resistors 62 and 64. The anodes of these controlled rectifiers 58 and 60 are respectively connected through relay windings 66 and 68 to the external or end taps of the secondary winding 56. The controlled rectifier's gate electrodes 70 and 72 are respectively connected through isolating resistors 74 and 76 to polarizing winding 30. These resistors 74 and 76 isolate the gate electrodes 70 and 72 from each other. The resistors 62 and 75 along with a variable resistor 78 constitutes a biasing network for the controlled rectifier 58. The resistors 77, 64 and adjustable resistor 80 serve the same biasing function for the controlled rectifier 60.

These controlled rectifiers 58 and 60 may be of any suitable commercially available kind, such as those known as silicon and germanium controlled rectifiers.

To explain the operation of the control circuit 46 it will be assumed that the error signal is of the same phase, i.e., positive going, as the voltage from the source 54 applied to the anode of the controlled rectifier 58. If this error signal exceeds the gate trigger voltage, the controlled rectifier 58 will fire and conduct on each positive half-cycle of the source 54 so as to complete a circuit extending from the transformer secondary 56 through the relay winding 66. The biasing network comprising the resistors 62, 78 and 74 is preferably so adjusted that a positive .3 volt error signal will cause the controlled rectifier 58 to fire. The biasing network for the controlled rectifier 60 would be similarly adjusted, however, the controlled rectifier 60 would conduct on each negative half-cycle of the source assuming the error signal was a minus .3 volt.

Because the error signal alternates at the frequency of the source 40 and of course the source 54, the controlled rectifier 58 will turn off when the error signal passes through zero. To maintain the relay winding 66 continuously energized, as long as the controlled rectifier 58 is biased on, a diode 79 is connected in shunt with the relay winding 66 so as to maintain current flow therethrough when the controlled rectifier 58 is off during each half-cycle of the source 54. A similar diode 81 is shunted across the relay winding 68 for the same purpose. These diodes 79 and 81 have the additional function of protecting the controlled rectifiers 58 and 60 against damage from excessive forward break over voltages.

The indexing motor 48 receives its power from an AC source 82, also preferably at 115 volts and 60 cycles per second so that the sources 54, 40 and 82 can all be the same. The relay windings 66 and 68 control this power through the agency of their associated contacts. For this purpose the relay winding 66 has normally open contacts 66a and normally closed contacts 66b, while the relay winding 68 has normally open contacts 68a and the normally closed contacts 68b located as illustrated.

For exemplary purposes, when the normally open contacts 66a are closed, the indexing motor 48 will revolve the workpiece 12 clockwise, and when the normally open contacts 68a are closed, the power from the source 82 is supplied to the indexing motor 48 so as to cause the workpiece 12 to be revolved counterclockwise.

As was previously discussed, provision is made for insuring that the workpiece 12 is not in the wrong null position. For example, the workpiece 12 could be in such a position that the unbalanced portion was 180° displaced from the unbalance correction mechanism 16, which will assumed to make the correction by drilling into the unbalanced portion. The armature 32 would, as explained, be in its 270° position. Consequently, the error signal would be nulled, but at the wrong null position. Because the wrong null is normally unstable, the system will drive itself out of this null provided there is some initial movement. Since the workpiece 12 can be stationary and in this wrong null position at the beginning of the indexing cycle, the cycle is always commenced by initiating workpiece movement if in either null position. To do this another relay winding, denoted by the numeral 84, is arranged in parallel with the source 82 and in series with its normally open contacts 84a and the normally closed contacts 66b and 68b. The relay winding 84 has additional normally open contacts 84b positioned in parallel with the contacts 68a. A start switch 86 is connected across the contacts 84a and is closed by the controller 14 when the indexing cycle is initiated. Since the contacts 66b and 68b are normally closed in either null position, the relay winding 84 will be energized and close its normally open contacts 84a and 84b. The switch 86 is then opened and power is supplied to the indexing motor 48 so as to initiate, for exemplary purposes, counterclockwise movement. The indexing motor 48 will continue to drive in this direction until the error signal exceeds the gate trigger voltage of one of the controlled rectifiers 58 or 60. When this occurs the related relay winding 66 or 68 will be energized and open the normally closed contacts 66b or 68b so as to deenergize the relay winding 84. Accordingly, the contacts 84b will open and indexing proceeds in the normal way. For instance, if the normally open contacts 66a were closed, the indexing motor 48 would commence to revolve the workpiece 12 in a clockwise direction until the proper null occurred.

Although there is no phase shift in the system due to rotation, by calibration the error signal is phase shifted so as to be of a slightly different phase from that of the source 54. Preferably, the error signal leads the anode voltage and, therefore, achieves its peak amplitude prior to the controlled rectifier's anode voltage so that the controlled rectifier will fire prior to the voltage from the source 54 reaching its peak. This phase difference causes the controlled rectifiers to be on for a longer time than if the error signal and anode voltages were in phase and thereby avoid partial energization of the relays 66 and 68 and the undesired chatter.

Another feature of the apparatus is the coast stopping. Keeping in find that the controlled rectifiers will turn off when the anode voltage passes through zero, provided the error signal is below their firing level, the bias on the controlled rectifiers is so selected that the time at which the amplitude of the error signal becomes less than the firing level of the controlled rectifiers results in the indexing motor 48 coasting to a stop at the precise time that the unbalanced portion of the workpiece 12 is properly aligned with the unbalance correction mechanism 16. In other words, if it is assumed that the correct stop point for the indexing motor 48 results when the turn-off is initiated with the workpiece 12; e.g., 10° from the point where the error signal is nulled, the bias is adjusted so that the controlled rectifiers turn off when the error signal corresponds to this 10° position. Consideration must also be given to friction, inertia, the operating characteristics of the indexing motor 48, etc.

Summarizing the operation now, the controller 14 is placed in automatic operation and initiates the measurement cycle by rendering operative the unbalance pickup 20, the drive motor 18, and the two-phase generator 31. During the measurement cycle the two-phase generator 31 excites the control transformer quadrature related windings 26 and 28 so as to provide the rotating magnetic field. The unbalance signal developed by the unbalance pickup 20 energizes the polarizing winding 30, and the resultant magnetic field, in coacting with the rotating magnetic field, causes the movable armature 32 to position itself in accordance with the location of the unbalance relative to the electrical reference from the two-phase generator 31, which corresponds to the mentioned imaginary reference point on the workpiece 12. This unbalance signal is also supplied to a memory 22 where it is retained for use by the unbalance correction mechanism 16. This completes the measuring cycle and next the indexing cycle is initiated by the controller 14 after allowing adequate time for the measuring cycle.

To initiate the indexing cycle the drive motor 18 is turned off and the sources 40, 54 and 82 are turned on. The two-phase generator 31 is also turned off, as is the unbalance pickup 20. The start switch 86 is momentarily closed so that the relay 84 is energized if the workpiece 12 is in either of its null positions and its contacts 84a and 84b are closed. Hence, the indexing motor 48 starts to drive in a counterclockwise direction to insure that the wrong null is avoided. The position sensor 36 now becomes effective so that its stator windings 42 and 44 are energized as the rotor 38 moves so as to develop voltages reflecting the position of the reference point on the workpiece 12 relative to the unbalance correction mechanism 16. The control transformer 24 likewise becomes effective and the stator windings 26 and 28 have corresponding voltages imposed thereon. The resultant magnetic field from these windings 26 and 28 energizes the polarizing winding 30 in accordance with the position of the armature 32, the position of which as explained determines the magnetic coupling. This energization of the polarizing winding 30 results in an error signal having a polarity and amplitude representing the angular location of the unbalance relative to the unbalance correction mechanism 16. If as previously explained this error signal is in phase with the power from the source 54 and is a positive .3 volt or more, the controlled rectifier 58 will fire and energize its related relay winding 66. The energization of the relay winding 66 causes the normally open contacts 66a to close and the normally closed contacts 66b to open. The relay 84 is deenergized and the indexing motor 48, because of the power supplied through the now-closed contacts 66a, causes clockwise movement to be imparted to the workpiece 12. Counterclockwise movement would occur in the same way if the error signal was a negative .3 volt and controlled rectifier 60 was turned on. Meanwhile, the error signal is decreasing until the resultant magnetic field from the stator windings 26 and 28 and the armature 32 are in the discussed 90° relative position. With a null error signal the controlled rectifier 58 will remain off and the indexing motor 16 will coast to a stop with the unbalanced portion of the workpiece 12 exactly aligned with the unbalance correction mechanism 16, assuming again correction is by drilling.

Now the correction cycle is started by the cycle controller 14 with power being supplied only to the unbalance correction mechanism 16. Drilling proceeds in accordance with the information stored on the memory 22 until the proper amount of material is removed. This completes the balancing operation.

The invention is to be limited only by the following claims.

What is claimed is:

1. In a balancing system, the combination of means maneuvering a workpiece and an unbalance correction mechanism relative to each other so that an unbalance correction can be made in the workpiece, control means for the maneuvering means, the control means being operative to cause the maneuvering means to maneuver the workpiece and the unbalance correction mechanism in a relative direction and an amount determined respectively by the phase and the amplitude of a signal supplied thereto, means responsive to the relative position of the workpiece and the unbalance correction mechanism, means electromagnetically coupling the position responsive means to the control means, and means altering the magnetic coupling therebetween in accordance with the location of the unbalance in the workpiece so that the control means is supplied with a signal of a phase and amplitude corresponding to the angular location of the unbalance in the workpiece relative to the unbalance correction mechanism, the control means also including switch means operative in response to the signal when of a certain amplitude and of one phase to cause the maneuvering means to maneuver the workpiece and the unbalance correction mechanism in one relative direction and when the signal is of a certain amplitude and of an opposite phase to cause the maneuvering means to maneuver the workpiece and the unbalance correction mechanism in another relative direction until the signal is nulled and the workpiece and the unbalance correction mechanism have a predetermined alignment.

2. The balancing system described in claim 1 wherein the switch means includes a pair of controlled rectifiers so arranged that one of the controlled rectifiers is operative when the signal is of the one phase and the certain amplitude to cause the maneuvering means to maneuver the workpiece and the unbalance correction mechanism in one relative direction and that the other controlled rectifier is operative when the signal is of an opposite phase and the certain amplitude to cause the maneuvering means to maneuver the workpiece and the unbalance correction mechanism in an opposite relative direction.

3. In a balancing system, the combination of means maneuvering a workpiece and an unbalance correction mechanism relative to each other so that an unbalance correction can be made in the workpiece, control means for the maneuvering means, the control means being operative to cause the maneuvering means to maneuver the workpiece and the unbalance correction mechanism in a relative direction and an amount determined respectively by the phase and the amplitude of a signal supplied thereto, means responsive to the relative position of the workpiece and the unbalance correction mechanism, means electromagnetically coupling the position responsive means to the control means, and means altering the magnetic coupling therebetween in accordance with the location of the unbalance in the workpiece so that the control means is supplied with a signal of a phase and amplitude corresponding to the angular location of the unbalance in the workpiece relative to the unbalance correction mechanism, the control means also including an AC source of opposite phase power, a pair of controlled rectifiers arranged in opposed relation, a relay in series with each of the controlled rectifiers, each relay being operative to cause the maneuvering means to maneuver the workpiece and the unbalance correction mechanism in different relative directions, the controlled rectifiers each having the control electrode thereof responsive to the signal and each having power of an opposite phase supplied thereto by the source so that only the one controlled rectifier with the signal of a certain amplitude and of substantially the same phase as the power supplied thereto becomes conductive to render its respective relay operative to cause the maneuvering means to maneuver the workpiece and the unbalance correction mechanism in one of the different relative directions until the signal is substantially nulled and accordingly the workpiece and the unbalance correction mechanism relatively positioned so that the unbalance correction can be made.

4. The balancing system described in claim 3 wherein each of the controlled rectifiers is biased so as to become nonconductive when the error signal has a predetermined magnitude corresponding to a certain displacement of the workpiece and the unbalance correction mechanism from the relative positions thereof for unbalance correction to allow coasting relative movement to the relative positions thereof for unbalance correction.

5. In a balancing system, the combination of means maneuvering a workpiece and an unbalance correction mechanism relative to each other so that an unbalance correction can be made in the workpiece, control means for the maneuvering means, the control means being operative to cause the maneuvering means to maneuver the workpiece and the unbalance correction mechanism in a relative direction and an amount determined respectively by the phase and the amplitude of a signal supplied thereto, means responsive to the relative position of the workpiece and the unbalance correction mechanism, means electromagnetically coupling the position responsive means to the control means, and means altering the magnetic coupling therebetween in accordance with the location of the unbalance in the workpiece so that the control means is supplied with a signal of a phase and amplitude corresponding to the angular location of the unbalance in the workpiece relative to the unbalance correction mechanism, the maneuvering means also including a reversible motor that rotates the workpiece relative to the unbalance correction mechanism and the control means includes an AC source of opposite phase power, a pair of controlled rectifiers arranged in opposed relation, a relay in series with each of the controlled rectifiers, each relay being operative to cause the motor to rotate the workpiece in one of its opposite directions, the controlled rectifiers each having the control electrode thereof responsive to the signal and each having power of an opposite phase supplied thereto by the source so that only the one controlled rectifier with the signal of a certain amplitude and of substantially the same phase as the power supplied thereto becomes conductive to render its respective relay operative to cause the motor to rotate the workpiece in one of the opposite directions until the signal is substantially nulled and accordingly the workpiece is positioned relative to the unbalance correction mechanism for unbalance correction.

6. The balancing system described in claim 5 wherein the control means further includes means initiating operation of the motor so as to rotate the workpiece in one direction when the signal is substantially a null.

7. The balancing system described in claim 5 wherein the control means further includes means initiating operation of the motor so as to rotate the workpiece in one direction when the signal is substantially a null and wherein each of the controlled rectifiers is biased so that the controlled rectifiers are rendered nonconductive when the error signal is of a predetermined magnitude corresponding to a certain displacement of the workpiece and the unbalance correction mechanism from the relative positions thereof for unbalance correction to allow coasting relative movement to the relative positions thereof for unbalance correction.

8. In a balancing system, the combination of means maneuvering a workpiece and an unbalance correction mechanism relative to each other so that an unbalance correction can be made in the workpiece, control means for the maneuvering means, the control means being operative to cause the maneuvering means to maneuver the workpiece and the unbalance correction mechanism in a relative direction and an amount determined respectively by the phase and the amplitude of a signal supplied thereto, means responsive to the relative position of the workpiece and the unbalance correction mechanism, means electromagnetically coupling the position responsive means to the control means, and means altering the magnetic coupling therebetween in accordance with the location of the unbalance in the workpiece so that the control means is supplied with a signal of a phase and amplitude corresponding to the angular location of the unbalance in the workpiece relative to the unbalance correction mechanism, the control means also including switch means operative in response to the output signal when of a certain amplitude and of one phase to cause the maneuvering means to maneuver the workpiece and the unbalance correction mechanism in one relative direction and when the output signal is of a certain amplitude and of an opposite phase to cause the maneuvering means to maneuver the workpiece and the unbalance correction mechanism in another relative direction until the output signal is nulled and the workpiece and the unbalance correction mechanism have a predetermined alignment for unbalance correction during the correction cycle.

9. The balancing system described in claim 8 wherein the switch means includes a pair of controlled rectifiers so arranged that one of the controlled rectifiers is operative when the output signal is of the one phase and the certain amplitude to cause the maneuvering means to maneuver the workpiece and the unbalance correction mechanism in one relative direction and that the other controlled rectifier is operative when the output signal is of an opposite phase and the certain amplitude to cause the maneuvering means to maneuver the workpiece and the unbalance correction mechanism in an opposite relative direction.

10. In a balancing system, the combination of means maneuvering a workpiece and an unbalance correction mechanism relative to each other so that an unbalance correction can be made in the workpiece, control means for the maneuvering means, the control means being operative to cause the maneuvering means to maneuver the workpiece and the unbalance correction mechanism in a relative direction and an amount determined respectively by the phase and the amplitude of a signal supplied thereto, means responsive to the relative position of the workpiece and the unbalance correction mechanism, means electromagnetically coupling the position responsive means to the control means, and means altering the magnetic coupling therebetween in accordance with the location of the unbalance in the workpiece so that the control means is supplied with a signal of a phase and amplitude corresponding to the angular location of the unbalance in the workpiece relative to the unbalance correction mechanism, the manuvering means also including a reversible motor that rotates the workpiece relative to the unbalance correction mechanism, and the control means further includes an AC source of opposite phase power, a pair of controlled rectifiers arranged in opposed relation, a relay in series with each of the controlled rectifiers, each relay being operative to cause the motor to rotate the workpiece in one of its opposite directions, the controlled rectifiers each having the control electrode thereof so arranged relative to the other of the windings as to be responsive to the output signal and each having power of an opposite phase supplied thereto by the source so that the one controlled rectifier with the output signal of a certain amplitude and of substantially the same phase as the power supplied thereto becomes conductive to render its respective relay operative to cause the motor to rotate the workpiece in one of the opposite directions until the output signal is substantially nulled and accordingly the workpiece is positioned relative to the unbalance correction mechanism for unbalance correction during the unbalance correction cycle.

11. The balancing system described in claim 10 wherein the control means further includes means initiating operation of the motor so as to rotate the workpiece in one direction when the output signal is of a certain amplitude.

12. The balancing system described in claim 10 wherein each of the controlled rectifiers is biased so that the controlled rectifiers are rendered nonconductive when the output signal is of a predetermined magnitude corresponding to a certain displacement of the workpiece and the unbalance correction mechanism from the relative positions thereof for unbalance correction to allow coasting movement of the motor until the workpiece and the unbalance correction mechanism are positioned in the relative positions thereof for unbalance correction.

13. The balancing system described in claim 10 wherein the control means further includes means initiating operation of the motor so as to rotate the workpiece in one direction when the signal is substantially a null and wherein each of the controlled rectifiers is biased so that the controlled rectifiers are rendered nonconductive when the error signal is of a predetermined amplitude corresponding to a certain displacement of the workpiece and the unbalance correction mechanism from the relative positions thereof for unbalance correction to allow coasting movement of the motor until the workpiece and the unbalance correction mechanism are in the relative positions thereof for unbalance correction.

References Cited

UNITED STATES PATENTS 3,319,470   5/1967   Lash _____ 73—462

FOREIGN PATENTS 801,239   9/1958   Great Britain.
893,197   4/1962   Great Britain.

JAMES J. GILL, Primary Examiner